June 16, 1925.

S. D. LOCKE 1,541,832

PORTABLE FLEXIBLE TRACK AND PROCESS FOR MAKING THE SAME

Filed Feb. 3, 1920

5 Sheets-Sheet 1

WITNESS:

INVENTOR.
Sylvanus D. Locke
BY
ATTORNEYS

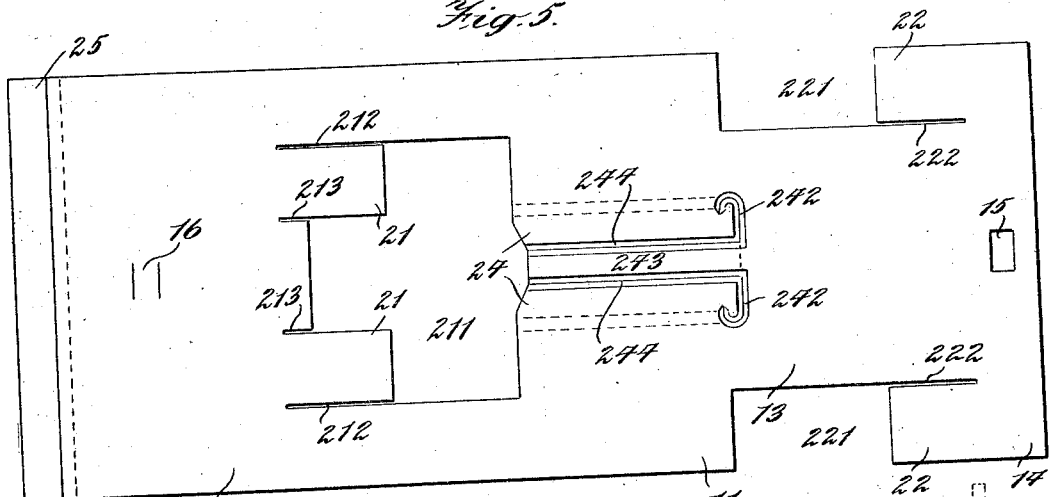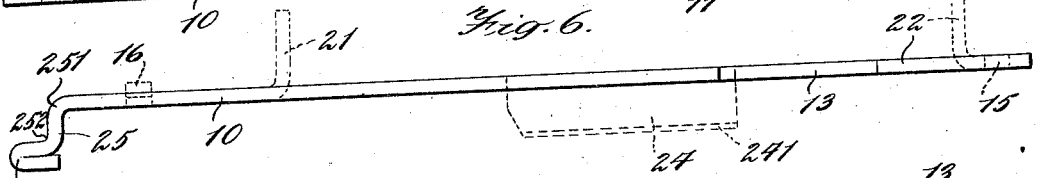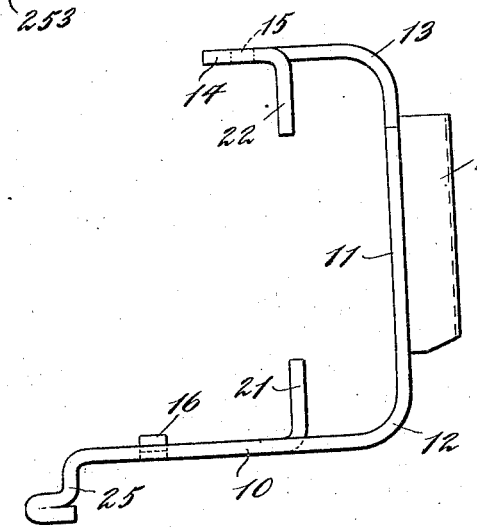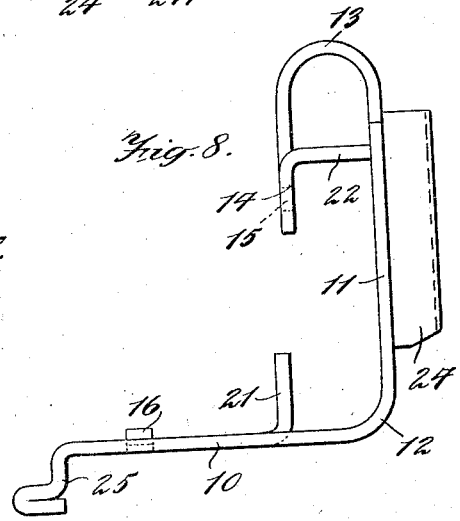

June 16, 1925.
S. D. LOCKE
PORTABLE FLEXIBLE TRACK AND PROCESS FOR MAKING THE SAME
Filed Feb. 3, 1920 5 Sheets-Sheet 3
1,541,832
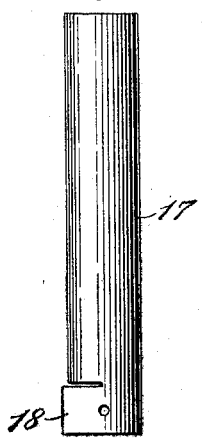
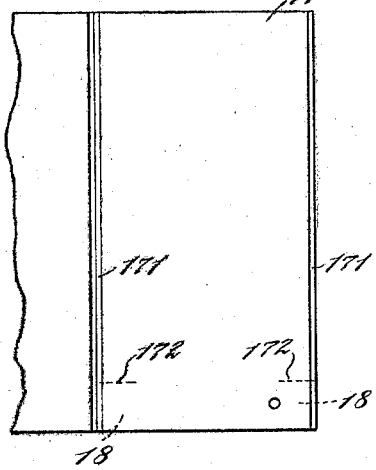
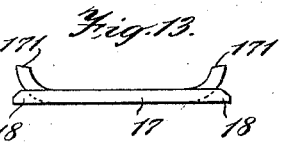
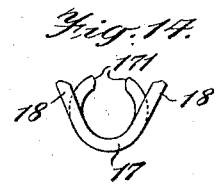
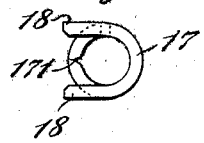
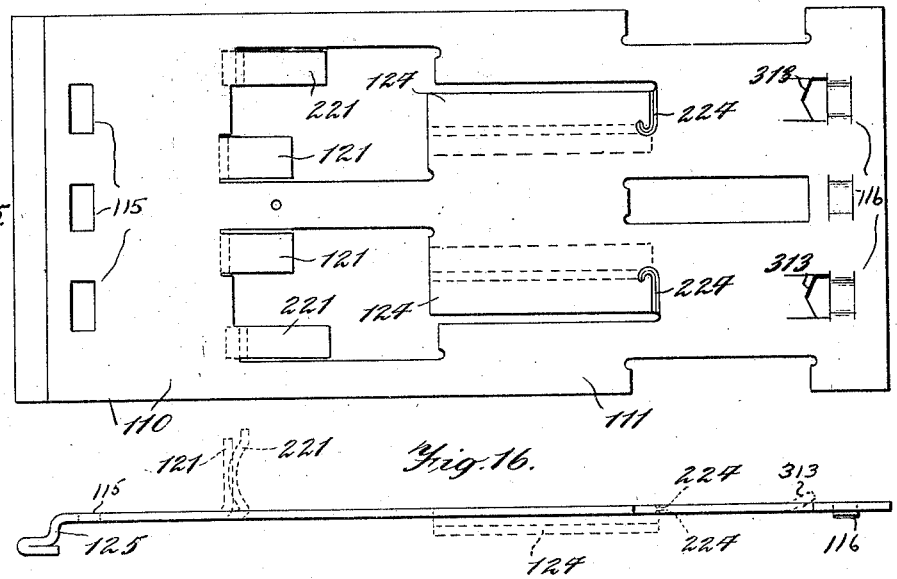
WITNESS:
INVENTOR.
Sylvanus D. Locke
BY
ATTORNEYS

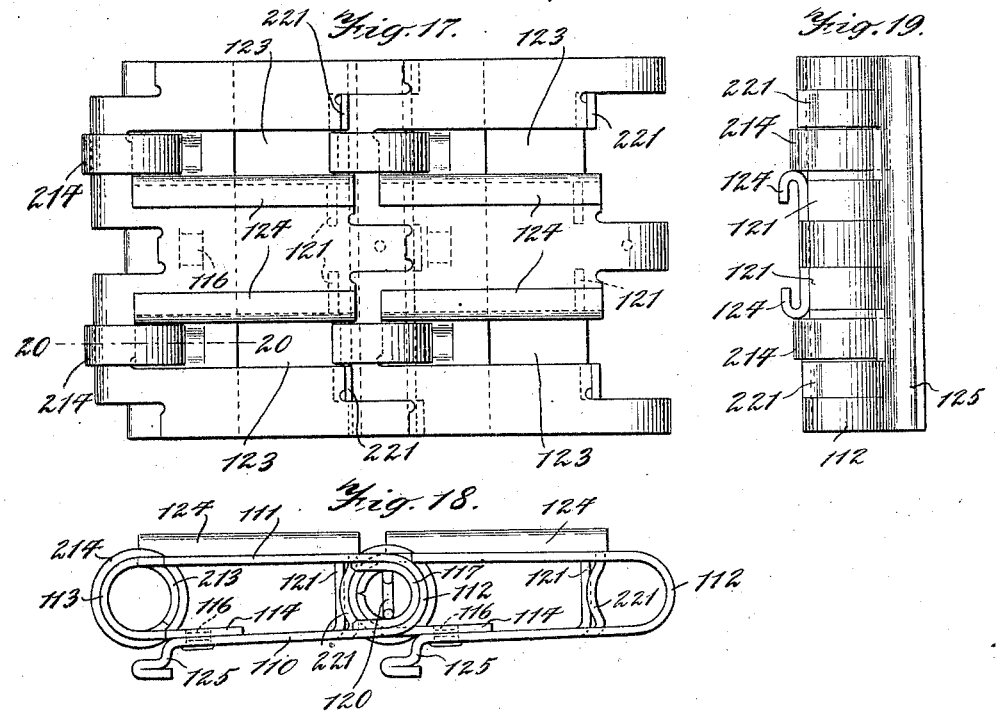
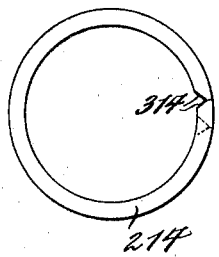
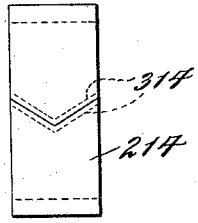
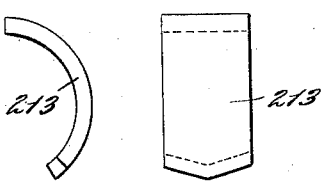
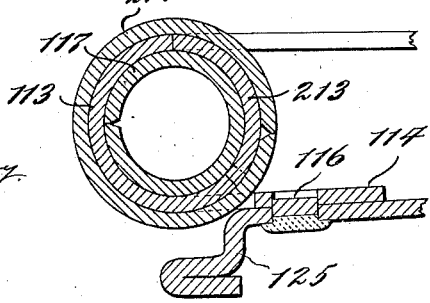

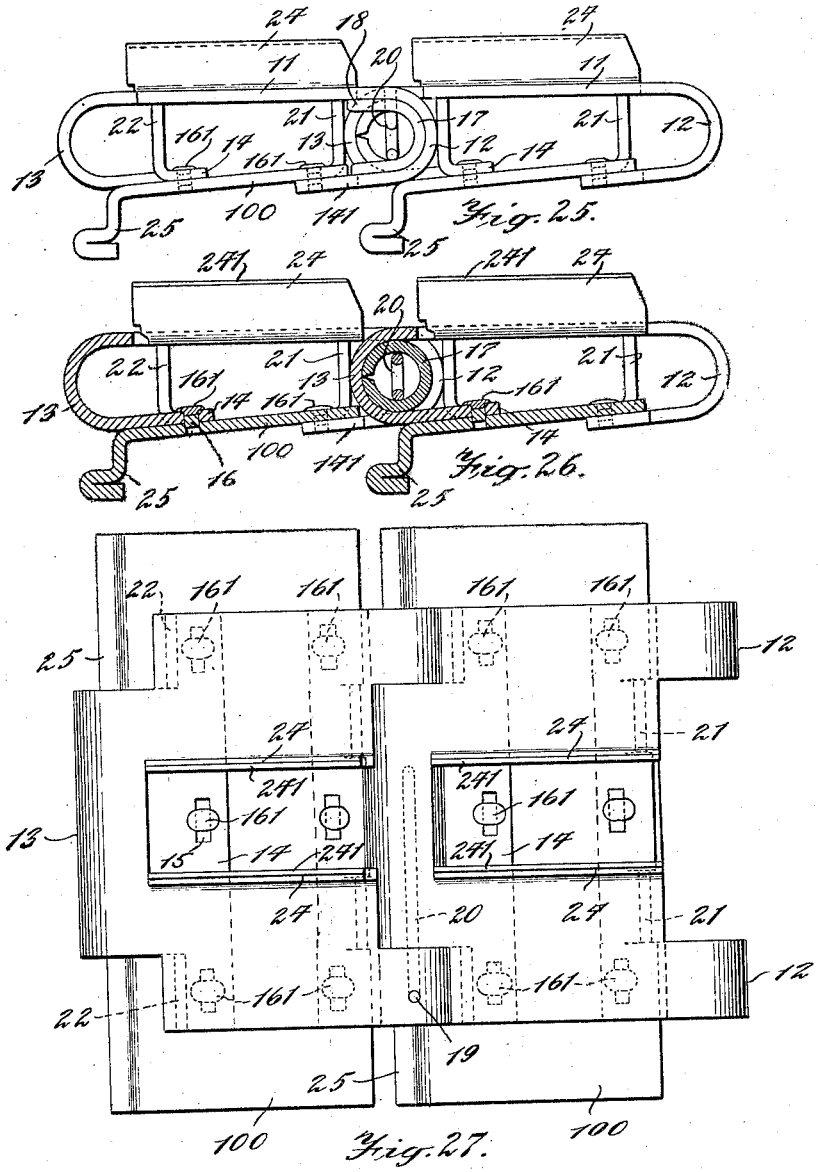

Patented June 16, 1925.

1,541,832

UNITED STATES PATENT OFFICE.

SYLVANUS D. LOCKE, OF BRIDGEPORT, CONNECTICUT.

PORTABLE FLEXIBLE TRACK AND PROCESS FOR MAKING THE SAME.

Application filed February 3, 1920. Serial No. 356,110.

*To all whom it may concern:*

Be it known that I, SYLVANUS D. LOCKE, a citizen of the United States, residing at Bridgeport, in the county of Fairfield and State of Connecticut, have invented certain new and useful Improvements in Portable Flexible Tracks and Processes for Making the Same, of which the following is a specification.

My invention relates to chains particularly of the type adapted for use as tracks for track laying types of tractors and more particularly to such chain, the links of which are adapted to be made of sheet metal, and the process of making the same.

One of the objects of my invention is to provide such a chain composed of links made preferably entirely of sheet metal, in which case the metal can be homogeneous and of a high quality, which is not possible when the links are cast. Another object of my invention is to provide such a sheet metal link in which all of the parts which cooperate with the tractor sprockets and track wheels, and which engage the surface over which the tractor passes, may be integral with the link. Another object of my invention is to provide a sheet metal connecting pin for such chains which shall have a large bearing surface, and at the same time be relatively light, and which may be made of any desired quality of metal, such pin preferably being provided with devices by which the pin will be prevented from turning in the link. Another object of my invention is to provide an efficient and economical process for fabricating sheet metal into track chain links.

Figure 1:
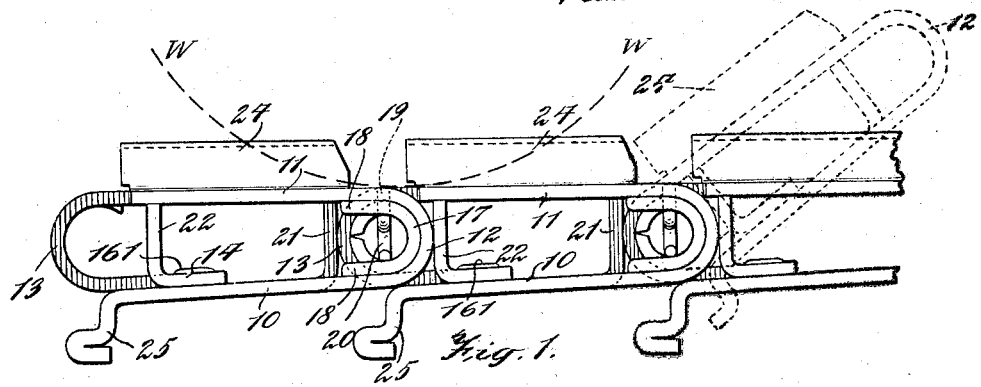
Figure 2:
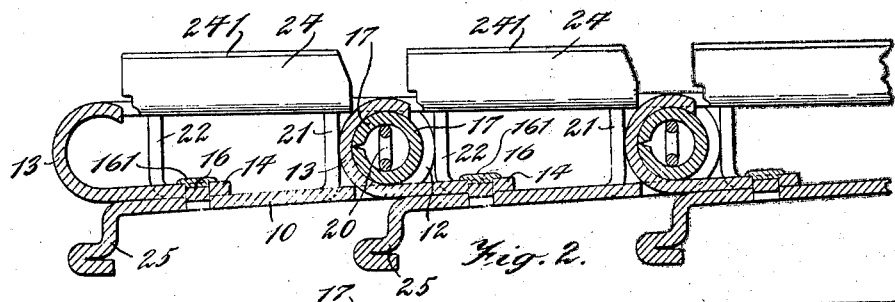
Figure 3:
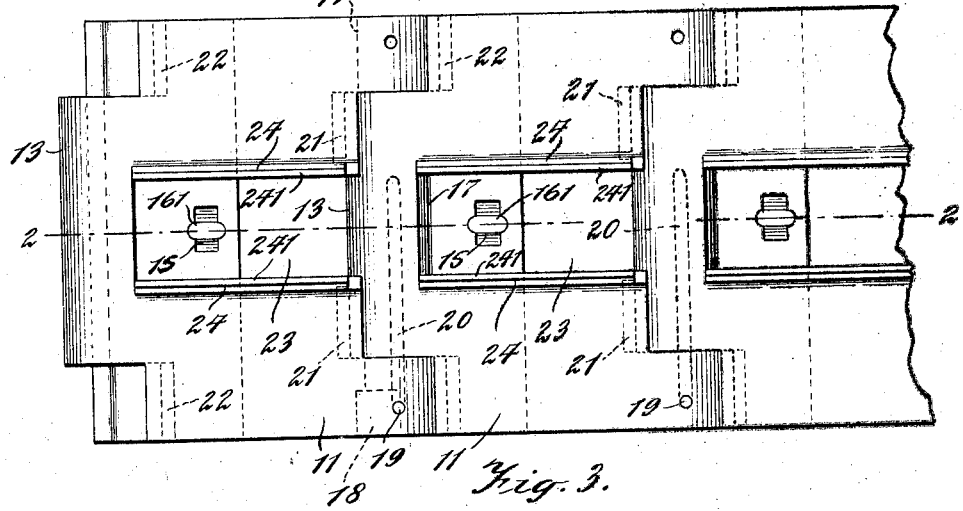
Figure 4:
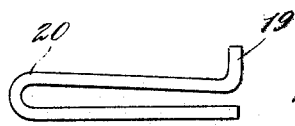

With these and other objects in view, my invention consists of certain novel features of construction, combination and arrangement of parts, and processing steps, as will be more fully described and pointed out in the appended claims In the drawings, Figure 1 is a side elevation of a portion of the chain embodying the preferred form of my invention, one of the links being turned to dotted line position; Figure 2 is a cross section on line 2—2 of Figure 3; Figure 3 is a plan view of the portion of a chain shown in Figures 1 and 2; Figure 4 is a side elevation of a detail; Figure 5 is a plan and Figure 6 a side elevation of the blank used in making the link of Figs. 1, 2 and 3; Figures 7 and 8 show different stages in the formation of such link; Figures 9 and 10 are side and end elevations, respectively, of the pin shown in Figures 1, 2 and 3; Figures 11 and 12 are respectively plan and elevation of a blank for the pin; Figures 13 and 14 show successive stages in forming the pin; Figures 15 and 16 are respectively plan and elevation of a blank for a double link; Figures 17, 18 and 19 are respectively plan, side and end elevation of a double link made from the blank shown in Figures 15 and 16; Figure 20 is an enlarged section on line 20—20 of Figure 17; Figures 21 and 22 are two views of the roller of Figure 17 and Figures 23 and 24 are two views of a detail and Figures 25, 26 and 27 are respectively side elevation, vertical section and plan of a modification.

The corresponding parts are referred to both in the drawings and in the specification by similar reference characters.

In the drawings I have shown my preferred form of chain as it will be adapted for use as track with track laying type of tractors, in which each link will be formed completely of a single piece of sheet metal with each link of the chain exactly like all of the other links, and with sheet metal tubular connecting pins held in place in the links so that the pin cannot turn in the link in which it is located.

In the preferred embodiment of my invention, and referring more particularly to Figs. 1, 2 and 3, each link is formed so as to provide a flat base or ground portion 10 and a flat top or track portion 11, there being a curved end portion 12 connecting the base and top portions, and at the opposite end a curved portion 13, the metal from which is extended to an overlapping portion 14, which lies in contact with the base portion 10. The key or portion 16 which enters the opening 15 may be secured with respect to the walls thereof so as to maintain the parts in position and provide a fastening in any suitable manner such as is shown, for example at 161 by an arc weld, to prevent the base portion and overlapping portion 14 from springing apart.

As will be best seen by inspection of Figure 3, the curved portion at one end of the link is cut away at either end so as to leave a relatively wide bearing portion, and similarly at the other end of each link the centre part of the curved portion is cut away to an amount equal to the width of the curved portion at the opposite end. With the links thus formed, the curved portion of one will fit within the opening in the curved portion of the other to form a hinge when the connecting pin is passed through the curved portions.

Such a pin, in my preferred form, is shown at 17, being formed preferably, as shown in Figures 9 and 10, so that for the greater portion of its length, it is a circular tube bent up from a single piece of sheet metal. Because of the differences in the width of the bearing portions on this pin in the two adjacent links, it is preferable that the pin be arranged so that it will be free to turn in the curved portion of one link while its rotation in the other link is prevented. Any suitable form of fastener may be used to connect one of the links with the pin to prevent the rotation of the latter, but preferably I form the pin as shown in Figure 9 and 10, with a pair of flat parallel wings 18, 18, which are adapted, as shown in Figures 1 and 3, to engage between the base and top portions of the link, thus preventing the rotation in that link which has the shorter bearing. As shown in Figures 1 and 2, the longitudinal joint in the pin formed by the meeting edges of the blank, is located on the side adjoining the end portion 13 which turns on the pin. In order that this joint may be smooth and therefore not affect the turning movement of the links on the pin, the edges of the blank are beveled on the inner face of the pin, as shown at 171 Figure 10. My preferred method of forming the pin will be hereinafter described.

In order to prevent the pin from moving out of the chain endwise, I preferably provide the arrangement shown in Figures 1, 2 and 3, in which a hole is punched near the end of the pin and also at a corresponding point in the link, and into these two holes is inserted the end 19 of a spring 20, the body of the spring being so shaped that it can be passed into the interior of the pin 17, and by pressing on the opposite side of this interior will normally hold the end 19 in place in the holes in the pin and the link. Any pin may be removed by pushing the end 19 downward out of the hole to release the pin.

As is well understood, flexible tracks of the type illustrated must not only provide a smooth, substantially continuous runway for the rollers which carry the weight of the vehicle, but the links of the track must be rigid to support such weight. By forming the sheet metal link in the manner herein described, I provide the necessary smooth and substantially continuous runway for the entire length of the flat portion of the top of each link for at least a portion of the width of the link. The rollers which carry the vehicle usually are much narrower than the surface which is provided for the support of the vehicle on the ground, so that a relatively narrow smooth runway is sufficient for the purpose. The necessary vertical rigidity to support the weight of the vehicle is obtained in the form illustrated by spacing members, 21 and 22, between the base and top portions near opposite ends of the link. While these spacing members may be separate pieces, preferably I form them integral with the link itself.

In order to hold the links in proper relation to the connecting pins, it is desirable to provide members on each link which will contact with the exterior of the curved portions on the adjacent links, and while these members may be separate pieces attached to the links, and may also be pieces in addition to the spacing members, in the form shown in Figures 1, 2 and 3, I arrange the spacing members 21 and 22 so that they will also function to hold the links in proper relation. It will be noted that the members 21 are located so as to contact with the exterior of the curved portion 13 of the adjacent link, and that, similarly, the spacing members 22 are arranged to contact with the exterior of the curved portion 12 of the adjacent link.

As arranged for use with the track laying tractors, preferably the form of chain shown in Figures 1, 2 and 3 is provided with sprocket openings 23 centrally located, and preferably I provide projecting guides 24 on either side of this opening. I have arranged these guides so as to combine therein several functions. They serve as guides for the track wheels which run on the track and support the tractor, these wheels being either double or provided with a groove to engage the guides. One of such wheels is indicated diagrammatically at W in Figure 1. The guides are also extended upwardly so as to engage the sides of the chain sprockets inside of the bottoms of the teeth. A solid portion of the sprocket, and not the sides of the teeth merely, therefore engage the chain to prevent side motion of the chain, thus providing a continuous instead of an intermittent guide to insure the sprockets of the wheels entering the sprocket opening 23. The guides also act as stiffeners of the top portion of the link, to prevent distortion through the weight transmitted through the track wheels. Preferably, the inner upper edges of these guides are beveled, as indicated at 241, this beveling preferably being formed in making the link in the manner more fully described hereinafter. The purpose of thus beveling the edges of these guides 24 is to preclude cutting of the sprocket teeth as they enter between the guides. With the chain thus constructed, it will be noted that the sprocket teeth will pass through the openings 23 and bear against the exterior of the pin 17 when the chain is running in one direction, and against the exterior of the curved portion 13 when running in the opposite direction.

When used as a track chain, it is desirable to provide the chain with grousers or spurs, and while these grousers might be formed of separate pieces and attached to the chain, I prefer to form them integral with the base portion of each link, and preferably by bending the extreme end portion, as shown in the drawings at 25. Preferably I locate and form the grousers 25 so that a portion thereof which bears on the chain-supporting surface, is beneath the centre of the link pin. When thus constructed, the link will not tilt as the track wheels pass from link to link when the track is supported on the grousers resting on a hard pavement, as would be the case if the grousers were located, for instance, to the right of the vertical centre line of the pins in Figures 1 and 2. It will be understood, of course, that the grousers may be of any desired shape and size, but in my preferred form I bend the metal at the end of the grouser back on itself one or more times to form two or more thicknesses of metal at the wearing surface thus making the life of this portion of the link equal to that of any other portion.

For most purposes, a link formed as shown in Figures 1, 2 and 3 in which the base or ground portion is only as wide as the top or track portion, answers the requirements. It is possible, however, that when working in certain soils and under certain conditions, it may be found desirable to make the ground portion wider than is required for the track portion. In order to avoid the loss of metal which would occur by making the top portion wider than is necessary or in cutting away the useless material of the top portion, I have devised the arrangement shown in Figures 25, 26 and 27 in which the link is formed precisely as already described, except that, instead of continuing the bottom portion 10 beneath the overlapping portion 14, I terminate it as shown at 141 in Figures 25 and 26, and insert between the portion 141 and the overlapping portion 14, a separate plate 100, which obviously may be of any desired width. The plate 100 is attached to the overlapping portion 14 and the base portion 141 in any suitable manner, such as that already described for the fastening together of the parts in the form shown in Figures 1, 2 and 3. In Figure 27, I have shown six of such connections or fastenings between the parts, but it is obvious that any desired number may be employed. As will appear from an inspection of Figures 25 and 26, the grouser 25 is preferably made integral with the plate 100, and the portion 141 is located at such an angle that when the plate 100 is inserted between it and the overlapping portion 14, the plate 100 with its grouser will occupy substantially the same position as the portion 10 in the form shown in Figures 1, 2 and 3.

It will be noted that in the form of link illustrated, the "nut cracker" effect found in most forms of track chains has been practically eliminated, so that, as the links turn around the connecting pins, the parts which approach each other so as to crush any material which happens to be between them, are reduced to a minimum.

It will also be noted that by causing the portion 10 or its corresponding portion 100, of each form of link, to overlap the portion 14, an angular relation of such portions 10, 100, with respect to the longitudinal center of the link is established and that this angle is sufficient to provide the necessary clearance between the bottom walls of adjoining ends of adjacent links to provide the necessary free angular motion between them.

It will also be noted that my novel link is formed with open sides so that any dirt which may pass into the link will be permitted to work out sidewise without being held within the link, thus avoiding the packing of dirt in the interior to interfere with the operation of the sprocket teeth.

The form of my invention shown in Figures 17–24 is a double link arranged to co-operate with a double sprocket. As will be seen by a comparison with the form shown in Figures 1, 2 and 3, this double sprocket form is in general of the same type as the chain just described but provided with a pair of openings spaced across the link to provide for the double sprockets, and also, in the form illustrated provided with rollers to engage the sprocket teeth. 110 is the base portion of the link, 125 the grouser, 112 and 113 the curved end portions, and 111 the top or track portion. The sprocket openings 123 are provided with projecting guides 124 which are arranged so that the outermost portion of each guide will contact with the sprocket moving in the adjacent openings 123 and the inside of the two guides being arranged to form a pathway through which the track wheels or rollers will pass, the wheels and the chain being guided in relation to each other by the contact between these inner edges of the guides 124 and the sides of the wheels or rollers, or with the parts supporting the rollers.

It will be noted that the bearing for the chain pin at the left hand end of the link, as shown in Figure 17, is divided into two parts, and the bearing at the right hand end into three parts, the curved parts at the opposite ends being arranged so as to fit into recesses in the opposite end of the adjacent link to form a hinge in the same manner as in the chain hereinbefore described. The chain pin is substantially the same as that used in the form shown in Figures 1, 2 and 3, such pin being made longer, however, and the locking spring 120 being substantially the same. The portion 114 may be fastened to the base 110 in the same manner as the corresponding parts are fastened in the form shown in Figures 1, 2 and 3 as by means of the key portion 116, of which there may be as many as desired. Since in this particular form the weight of the tractor is carried on the central portion of the link between the guides 124, 124, I find it preferable to provide two different kinds of members, one for the spacing function and another for the link holding function. The spacing members are shown at 121, 121 extending between the base 110 and the top 111 and preferably integral with one or the other of these parts. It will be noted that these members are positioned where the weight of the tractor is to be carried and are also spaced away from the exterior surface of the curved portion 113.

As members to hold the links in proper relation to the connecting pins I prefer the form shown at 221, 221 which, in the form illustrated, are integral with the base portion 110 and extend upwardly in front of a portion of the top portion 111, resting against the latter to prevent distortion of the member 221. If it is desired to use the members 221 as supports for the top of the link, then the two may be welded or joined otherwise in any suitable manner. The members 221 are curved so that for much the larger portion of their extent they adhere closely to the curved portion 113 with which they contact. There is, therefore much greater wearing surface and very little chance of any foreign substance entering the space between the member 221 and the curve 113 to be wedged between them to break or distort the link.

If desired, a roller may be mounted on the link to contact with the sprocket teeth and such an arrangement is shown in Figures 17–24. While obviously the bearing portions of the curved end 113 might be cut away opposite the spaces 123 so that a roller could be placed directly on the pin 117, I prefer to arrange the structure so that the link is not weakened as this cutting away would necessitate, and so that the link may have as wide a bearing as possible on the pin. As one form by which this arrangement may be carried out, I fit into the curved portion 113 a member 213 which completes the circle as shown best in Figure 20, the member 213 being provided at its lower end with a V shape which engages in a V notch formed in the curved portion 113. With the member 213 in place, as shown in Figure 20, a roller 214, preferably formed of sheet metal, is closed around the curved end 113 and the member 213 to produce the arrangement shown in Figure 20. It will be clear that the roller 214 will be held against lateral displacement by its contact with the sides of the opening 123 and will turn on the curved portions 113 and 213 as a bearing. The pin 117 in the arrangement just described does not therefore support the roller 214 but functions merely as a connecting pin in the manner heretofore described. In order that the roller 214 may have as little tendency as possible to engage any edge which may develop in the bearing surface on which it turns, by reason of faulty workmanship, I preferably bevel the inside ends of the blank as shown at 314 of Figure 21.

While the links I have hereinbefore described, when made of sheet metal, may be made in various ways, preferably I make them in the hereinafter described manner.

In forming the link shown in Figures 1, 2 and 3, I preferably start with a strip of sheet metal, for example steel, rolled to exactly the right width for the link to be made. Such strips are cut into proper lengths to form a blank having the grain thereof running lengthwise of the blank. Next I bend the metal at one end of the blank, as indicated at 251, 252 and 253, to form what will ultimately be a grouser or part of a grouser for the link.

Next I make a V score or scores, as indicated at 244, on a line or lines on the blank which are to constitute the upper edges of the guide flanges heretofore described. At the same time preferably I either score or punch holes at those points on the blank which are to constitute corners between the blank proper and portions thereof which are rolled or bent up to form or constitute the guide flanges, as indicated at 242. Next I strike, punch or cut out those portions of the blank which are to be entirely severed therefrom, as indicated at 211, 221, 243 and 15, and at the same time push down in the blank the key or lock section 16, shearing it along the side edges but not at the ends so that it remains integral at the ends with the blank. Next I sever the portions 21, 21, along the lines 212, 213, at the same time bending the free edges of said sections upwardly, as indicated in dotted lines in Figure 6, and in the opposite direction to the grouser section 25, preferably at the same time severing the sections 22, 22, along the line 222 and bending the free edges thereof in the opposite direction with respect to the blank to the grouser portion 25, as indicated in dotted lines in Figure 6. Next I break through or sever the portions 24 along the scores 242, 244 and at the same operation bend the flanges 24 substantially at right angles to the blank and in the same direction therefrom as the grouser section 25, as shown in dotted lines in Figure 6. I next bend up the blank into substantially U shape, as indicated in Figure 7, and then bend down the shorter leg of the blank to form the curved portion 13, as shown in Figure 8. Then I bend the longer leg of the blank to form the curved portion 12, carrying the grouser end of the portion 10 over on to portion 14 having the opening 15, the key 16 entering the opening 15 so as to provide a longitudinal lock for the overlapping portions of the link. In these last bending operations, the free edges of the portions 21 and 22 come into engagement with or substantial engagement with the adjacent inner wall of the portion 11 of the blank carrying the flanges 24, thereby constituting spacing members for properly spacing the lower portion 10 and upper portion 11 of the link with respect to each other.

It will be noted that the metal of the blank has been so shaped and formed that the section 25 forms a brace or support for the link against bending about a longitudinal axis whereas the flanges 24 serve to preclude the bending of the link or major portions thereof about a transverse axis and the integral sections 21 and 22 serve to space the upper and lower portions 10 and 11 with respect to each other while strengthening the link against both lateral and longitudinal bending and twisting. It will also be noted that the V scores 244 serve to form the bevels 241 on the guides 24.

The link shown in Figures 17, 18 and 19 is preferably formed in a manner similar to that which I have just described in forming the link shown in Figures 1, 2 and 3. The blank for this double link is shown in Figures 15 and 16, the grain in this blank running lengthwise thereof and the blank being cut from a strip of sheet metal, preferably steel, rolled to the correct width for the link to be made.

As before, I prefer to bend the metal at one end of the blank to form the grouser in the manner heretofore described. Next I either score or punch holes at those points on the blank which are to constitute corners between the blank proper and portions thereof which are rolled or bent up to form parts of the link, as indicated at 224. Next I strike, punch or cut out those portions of the blank which are to be entirely severed therefrom, as was done in forming the blank shown in Figure 5, and at the same time punch down in the blank the key or loop portions 116, these key portions being made in the manner heretofore described at the same time severing portions 221. Next I break through and bend the guide members 124, as shown in dotted lines in Figure 16 and curve the portions 221 and 313. The portions 121 are next severed and at the same time the free ends of these sections and those of 221 are bent upwardly, as indicated in dotted lines in Figure 16 and in opposite directions to the grouser section 125. From this point on the bending of the blank follows substantially the same course as that already described for the blank shown in Figures 5-8, and further description will be therefore unnecessary. It should be noted, however, that at 313, 313, I form V-shaped notches which are to receive the V-shaped end of the member 213.

In forming the pin 17 a blank of the proper width is first scored as shown in Figures 11 and 12, and a blank for a single pin then broken through, and after being sheared on the lines 172, 172, is bent successively into the shape shown in Figures 13 and 14 before finally being closed, as shown in Figure 10, the notch 171 outlining the blank constituting beveled edges at the meeting line of the two ends of the blank when formed into the circle to produce a smoother joint than would be possible if this surface were of the full width.

Particularly when used as a track chain, the best results are obtained when the links are formed of sheet metal with the grain of the metal running lengthwise of the chain, and preferably I form my individual links in this manner, as above described. The principal bends are thus made crosswise of the grain and there is therefore less danger of cracking the metal in bending and the edges of the link are round and smooth as in the rolled strip. Much less costly blanking tools are required than if the blanks were cut from a wider sheet.

Referring now particularly to Figures 5 and 15, it will be seen that, in my preferred form, the link is made from a single piece of sheet metal in which all of the projections are formed from metal removed from parts of the blank where such metal is not required in the finished link. Hence, there is very little material lost in forming the link and yet the link is one of the highest efficiency. Similarly, by forming the pin as shown in Figures 11-14, a minimum amount of metal is used and at the same time a light pin of maximum bearing surface is obtained.

It will also be noted that in the formation of the blank where a grouser is formed integral therewith, the first step in the making of the link is to bend the grouser section or portion with respect to the blank. This is done so as to insure that an operative in placing the blank on dies for a succeeding step or steps will place it flat and properly to insure that the burrs produced by the blanking die will be formed on what will ultimately be the inner sides of the surfaces of the curved ends and thus prevent cracking in the forming of such bends.

It will be noted that with my improved process I am enabled to use a relatively low priced steel which may be readily obtained and of a substantially homogeneous character, insuring a uniformity of the ultimately fabricated product; that the operations which I perform upon the said steel are peculiarly coordinated to take advantage of the structural and physical characteristics thereof, thereby serving to obtain the greatest strength out of the material for the resulting link. The operations which I perform on the link blank are all relatively simple and low priced ones and after the links are formed and preferably after they are connected together, I can subject them to a uniform tempering process in any well-known manner which will serve to increase both their strength and durability. It will be at once apparent that my process is a simplified one as compared with the making of links by castings of iron or steel, and that my product will be inherently more uniform and homogeneous than it is possible to obtain by present casting methods at anywhere near the same cost for the same strength and durability of link.

While I have shown and described the preferred form of my invention as applied to tracks for track laying tractors, it will be understood that many features of the invention may be applied to chains adapted for various uses, and that the several features of my invention may be used independently of other features.

I claim:—

1. A chain link comprising a single piece of sheet metal having a first flat portion, a first curved portion at the end of the first flat portion, a second flat portion at the end of said curved portion, a second curved portion at the end of the second flat portion and an overlapping portion at the end of the second curved portion and extending over the first flat portion, and spacing members, integral with the overlapping portion and extending upwardly into contact with the second flat portion, and spacing members integral with one of the flat portions and extending between the first and second flat portions adjacent the first curved portion.

2. A chain comprising a plurality of links and connecting pins, each link comprising a single piece of sheet metal having a base portion and a top portion spaced apart and connected by curved portions at each end, the curved portion at one end being cut away at each end and the curved portion at the other end being cut away whereby the curved portion of one link will have a space to accommodate the curved portion of the adjacent link, and sheet metal circular connecting pins each extending through the curved portions of a pair of adjacent links, each pin having a pair of projecting wings adapted to engage between the top and base portions of a link to prevent the pin from turning in the link.

3. A chain comprising a plurality of links and connecting pins, each link comprising a single piece of sheet metal having a base portion and a top portion spaced apart and connected by curved portions at each end, the curved portion at one end being cut away at each end and the curved portion at the other end being cut away whereby the curved portion of one link will have a space to accommodate the curved portion of the adjacent link, and sheet metal circular connecting pins each extending through the curved portions of a pair of adjacent links, each pin having a pair of projecting wings adapted to engage between the top and base portions of a link to prevent the pin from turning in the link, and a removable pin to prevent end motion of the connecting pin.

4. A chain comprising a plurality of links and connecting pins, each link comprising a single piece of sheet metal having a base portion and a top portion spaced apart and connected by curved portions at each end, the curved portion at one end being cut away at each end and the curved portion at the other end being cut away whereby the curved portion of one link will have a space to accommodate the curved portion of the adjacent link, and sheet metal circular connecting pins each extending through the curved portions of a pair of adjacent links, each pin having a pair of projecting wings adapted to engage between the top and base portions of a link to prevent the pin from turning in the link, and a spring located within the connecting pin and having one end projecting through openings in the pin and a link, said spring being constructed and arranged to hold the end normally in said openings and to permit its removal when a link is to be disconnected.

5. A chain comprising a plurality of links and connecting pins, one of said pins being hollow, and a spring located within said pin and having one end projecting through openings in the pin and an adjacent link, said spring being constructed and arranged to hold said end normally in said openings to prevent endwise motion of said pin and to permit the removal of said end when the chain is to be disconnected.

6. In a chain, a tubular chain connecting pin and a spring actuated locking pin extending through the wall of the connecting pin and engaging a link to prevent longitudinal displacement of the connecting pin.

7. In a chain, a tubular chain connecting pin and a spring actuated locking pin extending through the wall of the connecting pin and engaging a link to prevent longitudinal displacement of the connecting pin, the spring locking pin being located in the interior of said connecting pin.

8. A sheet metal chain pin comprising a circular tube of sheet metal constituting the major portion of the pin and a partly circular portion and a wing integral therewith and projecting beyond the periphery of the pin, said partly circular portion being integral with the tubular portion.

9. The method of making a chain link from a sheet metal blank, which consists in bending one end of the blank at an angle thereto to form a grouser section, scoring the blank along lines to mark the side edges of sections to be bent at an angle to the blank to form spacer and guide sections, striking out portions of the blank to form hinge elements for opposite ends of the link, breaking through and bending said spacing sections at an angle to said blank and on the opposite side thereof to said grouser section, breaking through the guide sections and bending them longitudinally of said blank on the same side thereof as said grouser section, bending the blank into substantial U shape, and bending the ends of said blank to overlap each other and form a loop with the free edges of said spacing sections substantially in engagement with the inner surface of the wall carrying said guide sections.

10. The method of making a chain link from a sheet metal blank, which consists in scoring the blank along lines to mark the side edges of sections to be bent at an angle to the blank to form spacer and guide sections, breaking through the guide sections and bending them longitudinally of and at an angle to said blank on one side thereof, striking out portions of the blank intermediate the ends thereof to form hinge elements for opposite ends of the link, breaking through and bending said spacing sections transversely of and at an angle to said blank on the opposite side thereof to said guide sections, and bending the ends of said blank to overlap each other and form a loop with the free edges of said spacing sections substantially in engagement with the inner surface of the wall carrying said guide sections.

11. The method of making a chain link from a sheet metal blank which consists in scoring the blank along lines to mark the side edges of sections to be bent at an angle to the blank to form spacer sections, striking out portions of the blank to form hinge elements for opposite ends of the link, breaking through and bending the spacing sections at an angle to said blank, bending the blank into substantial U shape and then bending the ends of the blank to overlap each other and form a loop with the free edges of said spacing sections substantially in engagement with the inner surface of the wall of the link opposite the wall from which said sections are bent up.

12. The method of making a chain link from a sheet metal blank, which consists in scoring the blank along lines to mark the side edges of sections to be bent at an angle to the blank and transversely to the grain thereof to form spacers and along lines to mark the edges of sections to be bent longitudinally of the grain of the blank to form guide sections, breaking through the guide sections and bending them longitudinally of the blank and of the grain thereof and at an angle to said blank on one side thereof, striking out portions of the blank intermediate the ends thereof to form hinge elements for opposite ends of the link, breaking through and bending transversely to the grain of the blank the said spacing sections and at an angle to said blank on the opposite side thereof to said guide sections, and bending the ends of said blank to overlap each other and form a loop with the free edges of said spacing sections substantially in engagement with the inner surface of the wall carrying said guide sections.

13. The method of making a chain link from a sheet metal blank which consists in scoring the blank along lines to mark the side edges of sections to be bent at an angle to the blank to form spacer sections, striking out portions of the blank to form hinge elements for opposite ends of the link, breaking through and bending the spacing sections at an angle to said blank, and at each end of the blank, bending the blank in to substantial U shape and then bending the ends of the blank to overlap each other and form a loop with the free edges of said spacing sections substantially in engagement with the inner surface of the wall of the link opposite the wall from which said sections are bent up.

14. The method of making a chain link from a sheet metal blank, which consists in scoring the blank along lines to mark the side edges of sections to be bent at an angle to the blank to form spacer and guide sections, breaking through the guide sections and bending them longitudinally of and at an angle to said blank on one side thereof, striking out portions of the blank intermediate the ends thereof to form hinge elements for opposite ends of the link, breaking through and bending said spacing sections transversely of and at an angle to said blank on the opposite side thereof to said guide sections, and with said guide sections between the spacing sections lengthwise of the blank, and bending the ends of said blank to overlap each other and form a loop with the free edges of said spacing sections substantially in engagement with the inner surface of the wall carrying said guide sections.

15. The method of making a chain link from a sheet metal blank, which consists in scoring the blank along lines to mark the side edges of sections to be bent at an angle to the blank to form spacer and guide sections, and cutting back the metal at the end of each line of bend between the body of the blank and a guide section to prevent tearing of the metal when the guide section is bent up, breaking through the guide sections and bending them longitudinally of and at an angle to said blank on one side thereof, striking out portions of the blank intermediate the ends thereof to form hinge elements for opposite ends of the link, breaking through and bending said spacing sections transversely of and at an angle to said blank on the opposite side thereof to said guide sections, and bending the ends of said blank to overlap each other and form a loop with the free edges of said spacing sections substantially in engagement with the inner surface of the wall carrying said guide sections.

16. In a one-piece pressed metal track belt unit having a substantially horizontal shoe member formed from the ends of the one piece of metal, which ends overlap and are connected together, and having a substantially horizontal top member in which is a longitudinally extended opening for the passage of sprocket teeth, the part of said top adjacent said longitudinal opening being formed with an upwardly bent integral longitudinal flange along an edge thereof, said top and bottom members being connected at one end of the unit by integral U-shaped strap loops, and being connected at the other end of the unit by at least one integral U-shaped strap loop which is disposed in line with an opening between strap loops at the other end of the unit.

17. A one-piece pressed metal track belt unit having a substantially horizontal shoe member formed from the ends of the one piece of metal, which ends overlap and are connected together, and having a substantially horizontal top member in which is a longitudinally extended opening for the passage of sprocket teeth, the part of said top adjacent said longitudinal opening being formed with an upwardly bent integral longitudinal flange along an edge thereof, said top and bottom members being connected at one end of the unit by integral U-shaped strap loops, and being connected at the other end of the unit by at least one integral U-shaped strap loop which is disposed in line with an opening between strap loops at the other end of the unit, said link being also formed with upwardly extended struts which are integral parts of the shoe portion and extend therefrom upward into engagement with the top portion.

18. A one-piece sheet metal track belt unit comprising a base portion and a top portion spaced apart and connected at their ends by curved portions of sheet metal, said curved portions being adapted to engage connecting pins placed in the interior thereof, the top portion having a sprocket opening and a longitudinal guide extending above the level of the top portion and integral therewith and parallel with and adjacent to the sprocket opening.

19. A one-piece sheet metal track belt unit comprising a base portion and a top portion spaced apart and connected at their ends by curved portions of sheet metal, said curved portions being adapted to engage connecting pins placed in the interior thereof, the top portion having a sprocket opening and a longitudinal guide extending above the level of the top portion and integral therewith and parallel with and adjacent to the sprocket opening, the guide being formed of the metal cut out to form the sprocket opening and bent up at right-angles to the top portion.

20. A rigid one-piece sheet metal unit for a flexible track belt, having parallel base and top portions spaced apart and connected at their ends by curved portions of sheet metal adapted to engage connecting pins placed in the interior thereof, the ends of the sheet metal piece being connected together to resist longitudinal extension of the unit from pressure on the connecting pins.

21. A rigid one-piece sheet metal unit for a flexible track belt, having parallel base and top portions spaced apart and connected at their ends by curved portions of sheet metal adapted to engage connecting pins placed in the interior thereof, the ends of the sheet metal piece being connected together to resist longitudinal extension of the unit from pressure on the connecting pins, and the unit having spacing pieces extending between the base and top portions and adapted to maintain them in spaced relation and to prevent the collapsing of the unit by the weight of the vehicle supported thereon.

22. A rigid one-piece sheet metal unit for a flexible track belt, having parallel base and top portions spaced apart and connected at their ends by curved portions of sheet metal adapted to engage connecting pins placed in the interior thereof, the ends of the sheet metal piece being connected together to resist longitudinal extension of the unit from pressure on the connecting pins, the top portion having a longitudinal opening adapted to receive a sprocket tooth, and a guide parallel to the opening and extending above the top portion.

23. A rigid one-piece sheet metal unit for a flexible track belt, having parallel base and top portions spaced apart and connected at their ends by curved portions of sheet metal adapted to engage connecting pins placed in the interior thereof, the ends of the sheet metal piece being connected together to resist longitudinal extension of the unit from pressure on the connecting pins, the base portion having a grouser formed integral therewith.

24. A rigid one-piece sheet metal unit for a flexible track belt, having parallel base and top portions spaced apart and connected at their ends by curved portions of sheet metal adapted to engage connecting pins placed in the interior thereof, the ends of the sheet metal piece being connected together to resist longitudinal extension of the unit from pressure on the connecting pins, the curved portions at each end forming strap loops, with at least one strap loop of one curved portion disposed in line with opening in the curved portion at the other end of the unit.

25. The method of making from a sheet metal blank the rigid one-piece sheet metal unit defined by claim 23, which consists in striking out portions of the blank to form hinge elements for opposite ends of the unit, cutting and bending the spacing sections at an angle to the blank, bending the blank into substantially U-shape and then bending the ends of the blank to overlap each other and form a loop with the free ends of the spacing sections substantially in engagement with the inner surface of the wall of the unit opposite the wall from which the spacing sections are bent up.

26. The method of making from a sheet metal blank the rigid one-piece sheet metal unit defined by claim 24, which consists in striking out portions of the blank to form hinge elements for opposite ends of the unit, cutting the guide sections and bending them longitudinally of and at an angle to the blank on one side thereof, bending the blank into a substantially U-shape and then bending the ends of the blank to overlap each other and form a loop.

27. The method of making from a sheet metal blank the rigid one-piece sheet metal unit defined by claim 26, which consists in striking out portions of the blank to form hinge elements for opposite ends of the unit, cutting the guide sections and bending them longitudinally of and at an angle to the blank on one side thereof, cutting and bending the spacing sections transversely of and at an angle to the blank on the side thereof opposite to said guide sections, and then bending the ends of the blank to overlap each other and form a loop with the free ends of the spacing sections substantially in engagement with the inner surface of the wall carrying the guide sections.

28. A sheet metal unit for a flexible track belt, having a sheet metal track portion with an integral curved part at one end of the track portion adapted to extend around the belt connecting pin at that end, a sheet metal base portion and sheet metal supports between the track portion and the base portion and integral with one of said portions, said supports being adapted to maintain the track portion in spaced relation to the base portion when the weight of the vehicle is carried by the track portion.

29. A sheet metal unit for a flexible track belt, having a sheet metal track portion and pin-receiving openings at either end of the track portion, a base portion and sheet metal supports between the track portion and the base portion and integral with one of said portions and adapted to maintain the track portion in spaced relation to the base portion when the weight of the vehicle is carried by the track portion, said supports being positioned between the pin receiving openings.

SYLVANUS D. LOCKE.